United States Patent [19]

Shido et al.

[11] Patent Number: 5,432,771
[45] Date of Patent: Jul. 11, 1995

[54] INFORMATION RECORDING/REPRODUCING APPARATUS FOR PERFORMING RECORDING/REPRODUCTION OF INFORMATION BY USING PROBE

[75] Inventors: Shunichi Shido, Sagamihara; Katsunori Hatanaka, Yokohama; Kunihiro Sakai, Isehara; Takahiro Oguchi, Ebina; Akihiko Yamano, Sagamihara, all of Japan

[73] Assignee: Canon Kabushiki Kaisha, Tokyo, Japan

[21] Appl. No.: 55,087

[22] Filed: May 3, 1993

[30] Foreign Application Priority Data

May 13, 1992 [JP] Japan .................................. 4-120660
Jun. 9, 1992 [JP] Japan .................................. 4-149636

[51] Int. Cl.⁶ .............................................. G11B 9/00
[52] U.S. Cl. ................................. 369/126; 369/107; 369/124; 250/306; 250/307; 359/3
[58] Field of Search ............... 369/126, 124, 112, 107; 205/306, 307; 365/151; 359/3, 15, 29, 35

[56] References Cited

U.S. PATENT DOCUMENTS 5,255,259 10/1993 Hatanaka et al. ................. 369/126

FOREIGN PATENT DOCUMENTS 63-161552 7/1988 Japan .
63-161553 7/1988 Japan .

OTHER PUBLICATIONS

G. Binning, et al., "Surface Studies by Scanning Tunneling Microscopy," Physical Review Letters, vol. 94, No. 1, pp. 57–61 (Jul. 5, 1982).

Primary Examiner—Georgia Y. Epps
Assistant Examiner—Kim-Kwok Chu
Attorney, Agent, or Firm—Fitzpatrick, Cella, Harper & Scinto

[57] ABSTRACT

A recording/reproduction of information is effected using a probe electrode arranged to oppose a recording medium. A distance between the probe electrode and the recording medium is controlled by applying a voltage therebetween. A current flowing through the probe electrode upon application of the voltage is detected while the scanning is performed with the probe electrode over the recording medium. A correlation between a signal output according to the current detection and a reference signal is obtained to produce a reproduction signal from which a noise component due to an influence of an atomic step present on a surface of the recording medium is removed. The reproduction of information is effected in accordance with the generated reproduction signal.

5 Claims, 5 Drawing Sheets

WRITING INFORMATION

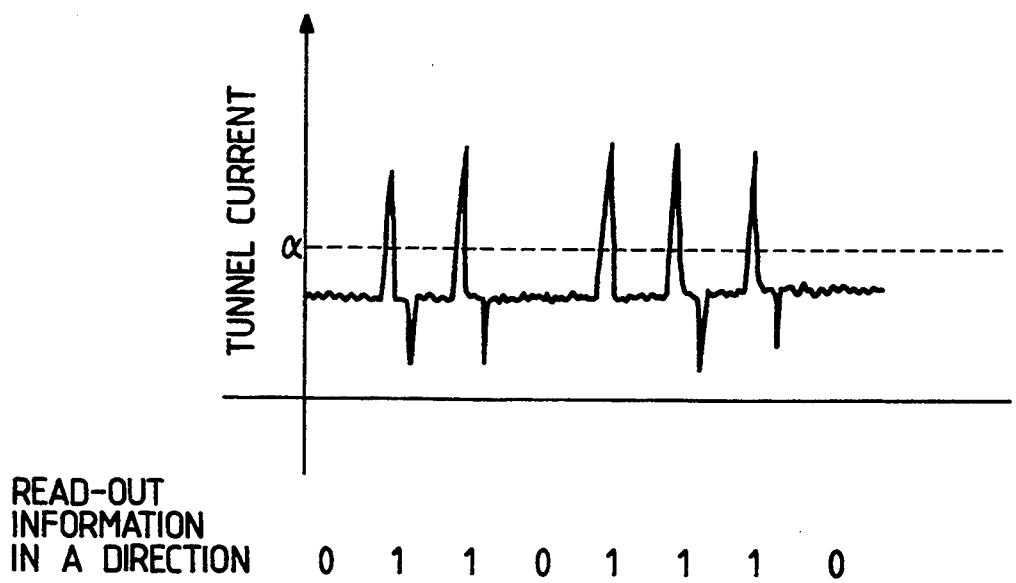
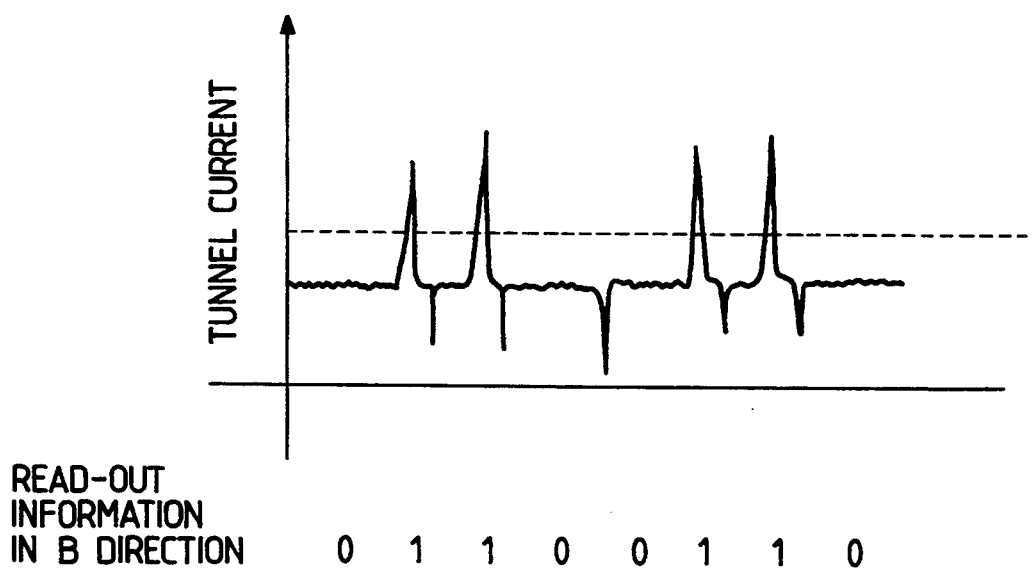

INFORMATION RECORDING/REPRODUCING APPARATUS FOR PERFORMING RECORDING/REPRODUCTION OF INFORMATION BY USING PROBE

BACKGROUND OF THE INVENTION

1. Field of the Invention

The present invention relates to an information recording/reproducing apparatus and, more particularly, to an information recording/reproducing apparatus for reproducing information from a recording medium by using the scanning tunneling electron microscope technology.

2. Related Background Art

The memory material technology is the core of the field of electronics industries, such as computers, peripheral devices of computers, video discs, and digital audio discs, and researchers are very enthusiastically developing memory materials in recent years. Conventionally, magnetic memories or semiconductor memories using magnetic substances or semiconductors as their materials have been the mainstream of memories. With recent development in the laser technology, however, optical memories using thin organic films consisting of, e.g., organic dyes or photopolymers have become available. The optical memory is an inexpensive recording medium with a high recording density.

Meanwhile, a scanning tunneling microscope (to be abbreviated as an STM hereinafter) capable of directly observing the electron structure of a surface atom of a conductor has been developed [G. Binning et al., Phys. Rev. Lett., 49, 57 (1982)], and this makes it possible to measure real space images of samples with a high resolving power regardless of whether the samples are single-crystal or amorphous. The STM also has an advantage that it can observe samples at a low electric power without damaging them with an electric current and can be operated even in the atmosphere. Therefore, the STM is expected to be put to use in a wide variety of applications.

The STM makes use of a phenomenon in which a tunnel current flows between a metal probe (probe electrode) and a conductive substance, as a sample, when the probe and the sample are moved closer together to a distance of about 1 nm with a voltage applied between them. Since this tunnel current responds exponentially to the change in distance between the probe and the sample, the STM is very sensitive to the surface condition of the sample. In addition, by scanning the probe in such a manner as to maintain the tunnel current constant, various pieces of information concerning the entire electron cloud in a real space can be read. The resolving power in the direction of the surface in this case is approximately 0.1 nm. Therefore, the application of the principle of the STM readily enables high-density recording and reproduction on the order of atoms (subnanometer).

As an example, a method of performing recording and reproduction by using the STM has been proposed, in which a thin film layer consisting of a material having a memory effect in voltage-to-current switching characteristics, such as a conjugated $\pi$ electron-based organic compound or a chalcogen compound, is used as a recording layer (Japanese Laid-Open Patent Application Nos. 63-161552 and 63-161553). That is, by applying a voltage exceeding a threshold value to this recording layer, the recording layer becomes transient between two different states according to the polarity of the voltage applied, and these states persist stably when no voltage is applied. The state of the recording layer can be detected by the value of a tunnel current obtained when the distance between the surface of the recording layer and a probe is maintained constant. Since the voltage exceeding the threshold value can be applied to the recording layer by using the probe for detecting the tunnel current, recording and reproduction of binary information can be performed at a recording density corresponding to the surface resolving power of the STM. According to this method, assuming the size of a recording bit is 10 nm, large-capacity recording and reproduction of up to $10^{12}$ bits/cm$^2$ can be performed. FIG. 1 shows an example of the construction of an information recording/reproducing apparatus according to this method.

In this information recording/reproducing apparatus, scanning of a probe electrode (probe) 102 for tunnel current detection is effected in each of the X, Y, and Z directions by a cylindrical piezoactuator 101. The X and Y directions are directions along the surface of a recording medium 103, and the Z direction is a direction perpendicular to the surface of the recording medium 103. A tunnel current detected by the probe electrode 102 is amplified by a current amplifier 104, and a high-frequency component of the current is extracted by a high-pass filter (HPF) 106 and output as reproducing information. A low-frequency component of the output from the current amplifier 104, on the other hand, is extracted by a low-pass filter (LPF) 105 and phase-compensated by a phase compensating circuit 107. An output from the phase compensating circuit 107 is supplied to an error amplifier 108 and fed back to the piezoactuator 101 via a sample-and-hold circuit 109. This feedback loop is provided to maintain the distance between the probe electrode 102 and the recording medium 103 constant by keeping the tunnel current constant. The distance can be controlled by an offset voltage to be applied to the error amplifier 108.

Reproduction of information performed by the above information recording/reproducing apparatus will be described below. Assume that the surface of the recording medium 103 is flat even on the atomic level and dot-like recording bits are formed in a direction of the surface of the recording medium 103. Assume also that the scanning of the probe electrode 102 is effected in the direction of the surface of the recording medium 103 while the distance between the surface of the recording medium 103 and the tip of the probe electrode 102 is precisely maintained constant. The consequent tunnel current changes, ideally, between two large and small values in accordance with the recording condition, as shown in FIG. 2. A high-frequency component of the tunnel current exhibits, as shown in FIG. 3, a change represented by a pulse that is oscillated upward or downward for each change in tunnel current shown in FIG. 2. That is, in the high-frequency component of the tunnel current, a pair of two pulses (one on the (+) side, and the other on the (−) side) correspond to one recording bit. Reproduction of information is performed by detecting the high-frequency component of the tunnel current.

Suppose a step structure (atomic step) with a thickness of about an atomic layer exists on the surface of the recording medium 103. In this case, this step of the atomic order unavoidably remains on the surface of the recording medium even if a thin gold film, which is formed by a molecular beam epitaxial (MBE) process and smooth on the atomic order, is used as the undercoating electrode of the recording medium. The consequent tunnel current also changes in the location of the step, as shown in FIG. 4, and so the high-frequency component of the tunnel current contains a pulse component even in the location of the step, as shown in FIG. 5.

The above conventional information recording/reproducing apparatus has a problem that if a step is present on the surface of a recording medium, a signal is also mixed from this step into the high-frequency component of a tunnel current, adversely affecting reproduction of information.

SUMMARY OF THE INVENTION

It is an object of the present invention to provide an information recording/reproducing apparatus in which reproduction of information is not adversely affected even when a step structure or the like exists on the surface of a recording medium.

The above object of the present invention is achieved by an information recording/reproducing apparatus for performing recording and reproduction of information by using a probe electrode arranged to oppose a recording medium, comprising voltage applying means for applying a voltage between the recording medium and the probe electrode, current detecting means for detecting a current flowing through the probe electrode upon application of the voltage, and reproduction signal generating means for generating, from an output signal from the current detecting means, a reproduction signal from which a noise component due to an influence of an atomic step present on a surface of the recording medium is removed, wherein reproduction of information from the recording medium is performed on the basis of the reproduction signal generated by the reproduction signal generating means.

In addition, the above object of the present invention is achieved by an information recording/reproducing apparatus for performing recording and reproduction of information by using a probe electrode arranged to oppose a recording medium, comprising voltage applying means for applying a voltage between the recording medium and the probe electrode, current detecting means for detecting a current flowing through the probe electrode upon application of the voltage, storage means for storing a reference reproduction signal pattern, and observing means for observing a correlation between an output signal from the current detecting means and the reference reproduction signal pattern stored in the storage means, wherein reproduction of information from the recording medium is performed on the basis of the observation result obtained by the observing means.

Furthermore, the above object of the present invention is achieved by an information recording/reproducing apparatus for performing recording and reproduction of information by using a probe electrode arranged to oppose a recording medium, comprising scanning means for causing the probe electrode to scan the recording medium forward and backward, voltage applying means for applying a voltage between the recording medium and the probe electrode, current detecting means for detecting a current flowing through the probe electrode upon application of the voltage, storage means for storing a signal corresponding to an output signal from the current detecting means detected when the scanning means performs forward scan, and comparing means for comparing a signal corresponding to an output signal from the current detecting means detected when the scanning means performs backward scan with the signal stored in the storage means, wherein reproduction of information from the recording medium is performed on the basis of the comparison result obtained by the comparing means.

BRIEF DESCRIPTION OF THE DRAWINGS

FIGS. 11A and 11B are timing charts showing tunnel current signals when a probe is scanned in A and B directions, respectively, shown in FIG. 10.

DETAILED DESCRIPTION OF THE PREFERRED EMBODIMENTS

Figure 6:
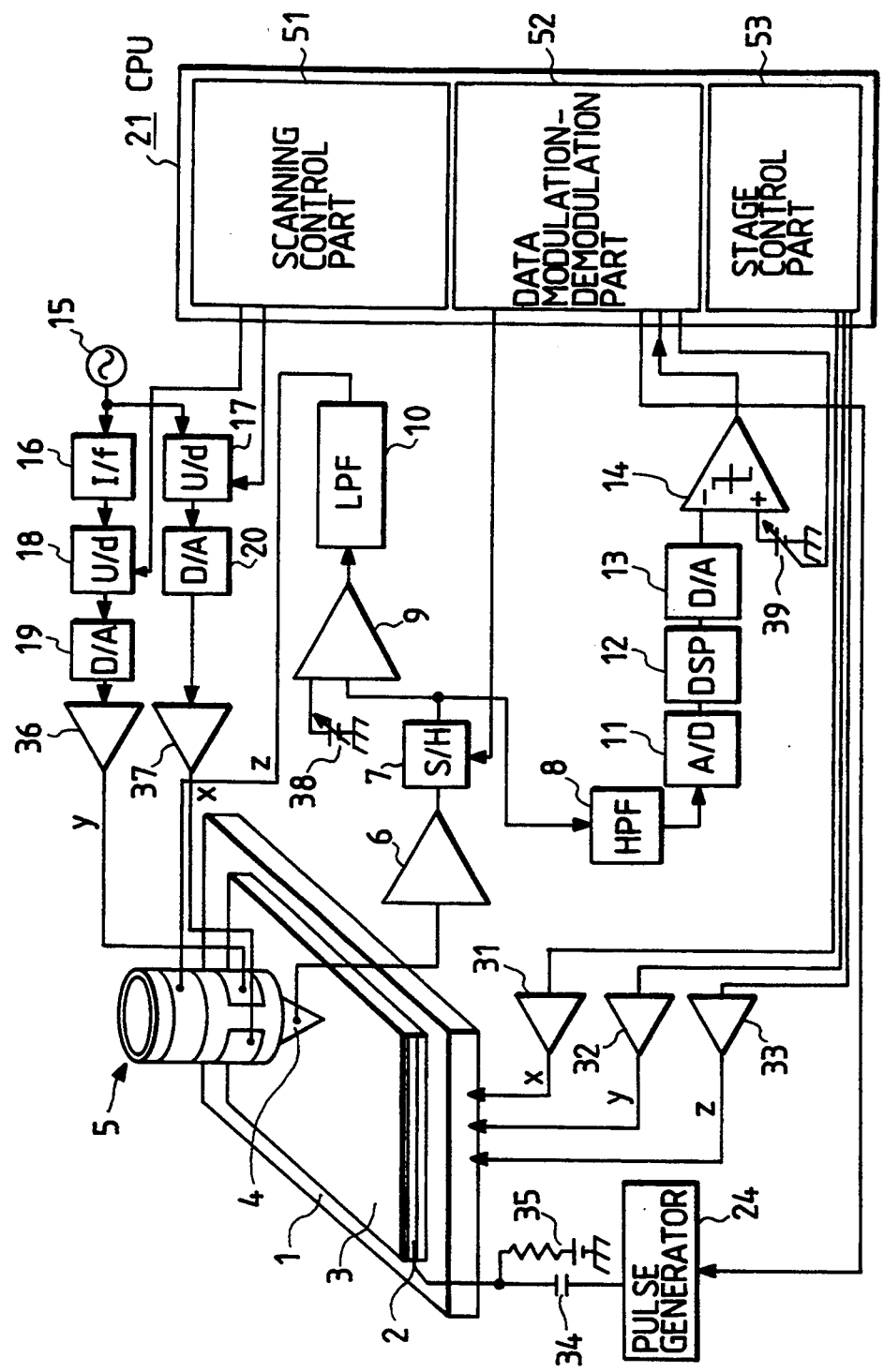
FIG. 6 is a block diagram showing the first embodiment of an information recording/reproducing apparatus according to the present invention.

The first embodiment of the present invention will be described below with reference to the accompanying drawings. FIG. 6 is a block diagram showing the construction of an information recording/reproducing apparatus according to the first embodiment of the present invention.

The entire information recording/reproducing apparatus is controlled by a CPU 21. The apparatus comprises a stage 1 having coarse moving mechanisms for the X-, Y-, and Z-axis directions; a smooth lower electrode layer 2 formed on the stage 1; a recording layer 3 formed on the lower electrode layer 2; and a cylindrical actuator 5. A probe electrode 4 having a very sharp tip is attached to the actuator 5 so as to oppose the recording layer 3. The actuator 5 is for finely moving the tip of the probe electrode 4 in each of the X, Y, and Z directions and can move the tip of the probe electrode 4 in units of, for example, 2 µm in each direction. The X and Y directions are directions along the surface of the recording layer 3, and the Z direction is a direction perpendicular to the surface of the recording layer 3. The stage 1 is connected to the output terminals of buffers 31, 32, and 33 for the X, Y, and Z directions, respectively, and driven by signals applied from a stage control part 53 of the CPU 21 to the buffers 31 to 33. The lower electrode layer 2 is connected to a power source 35 for applying a bias voltage and a pulse generator 24 via a capacitor 34. The pulse generator 24 is for writing information in the recording layer 3 in accordance with a data modulation signal from a data modulation-demodulation part 52 of the CPU 21.

A reference frequency generator 15 is also provided to supply clocks to a frequency divider 16 and an X-direction up/down counter 17. An output from the frequency divider 16 is supplied to a Y-direction up/down counter 18. An output from this up/down counter 18 is D/A-converted by a D/A converter 20, amplified by a buffer 36, and supplied to the Y-direction driving terminal of the actuator 5. An output from the up/down counter 17, on the other hand, is D/A-converted by a D/A converter 19, amplified by a buffer 37, and supplied to the X-direction driving terminal of the actuator 5. A switching between addition and subtraction in each of the up/down counters 17 and 18 is performed by a signal from a scanning control part 51 of the CPU 21. In this embodiment, the up/down control is performed such that both the D/A converters 19 and 20 output triangular waves. As a consequence, the probe electrode 4 repeatedly moves forward and backward in the X direction and at the same time moves forward and backward in the Y direction incommensurably slower than in the X direction, scanning a whole predetermined region of the recording layer 3. The ratio of the scan rate in the X direction to that in the Y direction corresponds approximately to the frequency dividing ratio of the frequency divider 16.

The probe electrode 4 is connected to a current amplifier 6 for tunnel current detection, and an output from the current amplifier 6 is supplied to a sample-and-hold circuit 7. The output terminal of the sample-and-hold circuit 7 is connected to the input terminals of an error amplifier 9 and a high-pass filter 8. The input terminal of the error amplifier 9 is also connected to a variable power source 38. An output from the error amplifier 9 is supplied to the Z-direction driving terminal of the actuator 5 via a low-pass filter 10. This completes a feedback loop in the Z direction for the probe electrode 4. An output from the high-pass filter 8, on the other hand, is supplied to an A/D converter 11, and an output from the A/D converter 11 is supplied to the input port of a digital signal processor (DSP) 12. The output port of the digital signal processor 12 is connected to the input terminal of a D/A converter 13, and the output terminal of the D/A converter 13 is connected to the (−) input terminal of a comparator 14. The (+) input terminal of the comparator 14 is connected to a variable power source 39 whose voltage varies under the control of the data modulation-demodulation part 52 of the CPU 21. An output from the comparator 14 is supplied to the data modulation-demodulation part 52.

The operation of this embodiment will be described below.

First, control for the distance between the surface of the recording layer 3 and the probe electrode 4 will be described. The stage control part 53 of the CPU 21 coarsely moves the stage 1 to cause a predetermined storage area of the recording layer 3 to oppose the probe electrode 4. The sample-and-hold circuit 7 is then set in a through state, and a voltage of about 100 mV (in regular operation) is applied from the power source 35 to between the recording layer 3 and the probe electrode 4. The variable power source 38 connected to the error amplifier 9 is controlled such that a tunnel current of about 2 nA flows between the recording layer 3 and the probe electrode 4.

A tunnel current detected by the probe electrode 4 is converted (I/V-converted) into a voltage by the current amplifier 6 and supplied to the error amplifier 9. The error amplifier 9 produces an output corresponding to the difference between the output voltage from the current amplifier 6 and the voltage of the variable power source 38. Since this output is supplied to the Z-direction driving terminal of the actuator 5 via the low-pass filter 10, feedback control is eventually performed. Therefore, even if some disturbance occurs, the distance between the recording layer 3 and the probe electrode 4 is kept at a predetermined value (at which the tunnel current is about 2 nA). In this case, the low-pass filter 10 is inserted in order to eliminate the influence of a detection signal (expected to consist primarily of a high-frequency component) due to reproduction of information, thereby following only a component (expected to consist primarily of a low-frequency component because this component shows a change in a large scale compared to the size of a recording bit) produced by an inclination of the stage 1 or undulations of the underlying electrode layer 2. In addition, it is apparent to those skilled in the art that in order to positively change the distance between the recording layer 3 and the probe electrode 4, the variable power source 38 need only be operated.

Writing of information will be described next. While the scanning in the X and Y directions is performed with the tip of the probe electrode 4, the data modulation-demodulation part 52 of the CPU 21 supplies a write signal to the pulse generator 24 at a timing at which the probe electrode 4 reaches a predetermined write position, thereby applying a write pulse at a predetermined voltage between the recording layer 3 and the probe electrode 4. In this case, in order to prevent the feedback loop for controlling the position of the probe electrode 4 from being disturbed by the application of the write pulse, the data modulation-demodulation part 52 sends a hold signal to the sample-and-hold circuit 7, setting the sample-and-hold circuit 7 in a hold state so that the influence of the write pulse is not imposed on the error amplifier 9 and the like. Recording of a series of pieces of information is performed by generating write signals at given timings while the scanning in the X and Y directions is performed with the probe electrode 4.

Figure 7:
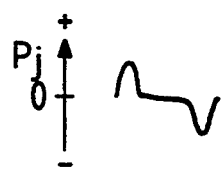
FIG. 7 is a timing chart showing an example of a signal pattern waveform used in bit determination.

Reproduction of information will be described below. Assume that the sample-and-hold circuit 7 is set in a through state, and a signal pattern as shown in FIG. 7 is stored beforehand in the digital signal processor 12. As this signal pattern, it is preferable to use a pattern similar to a pattern of the change in tunnel current obtained when the probe electrode 4 scans a portion in which ideal recording bits are formed. The signal pattern may be determined either on the basis of measurement values obtained when true recording bits are scanned or by a calculation based on the value of a tunnel current in each two-valued state of the recording layer 3, the size of a recording bit, and the scan rate.

The recording layer 3 is scanned in the X and Y directions by the probe electrode 4. A tunnel current between the recording layer 3 and the probe electrode 4 is detected by the current amplifier 6 and passed through the sample-and-hold circuit 7. A high-frequency component (detection signal) of the tunnel current is extracted by the high-pass filter 8. This high-frequency component contains the change in tunnel current due to the presence of recording bits, i.e., the detection signal. The high-frequency component is A/D-converted by the A/D converter 11 and stored in an internal memory (not shown) of the digital signal processor 12 for each one-way scan of the probe electrode 4 in the X direction.

The digital signal processor 12 sequentially compares data in its memory with the above-mentioned signal pattern. The comparison between the data and the pattern is performed as follows.

First, the data (of one scan in the X direction) in the memory of the digital signal processor 12 is corrected in signal amplitude and entirely standardized (normalized) to have a predetermined maximum amplitude. The total sum of absolute values of the differences between these standardized data and the signal patterns is calculated as a correlation value for each time width having the same length as the signal patterns. That is, assuming that the length of the signal patterns is n, the signal pattern is $P_j$ ($0 \leq j \leq n$), the length (corresponding to the length of one scan) of the data in the memory is m, and the data is $D_i$ ($0 \leq i \leq m$), Equation (1) below can be calculated:

$$O_i = \sum_{j=0}^{n} |P_j - D_{i+j}| \quad (1)$$

Figure 1:
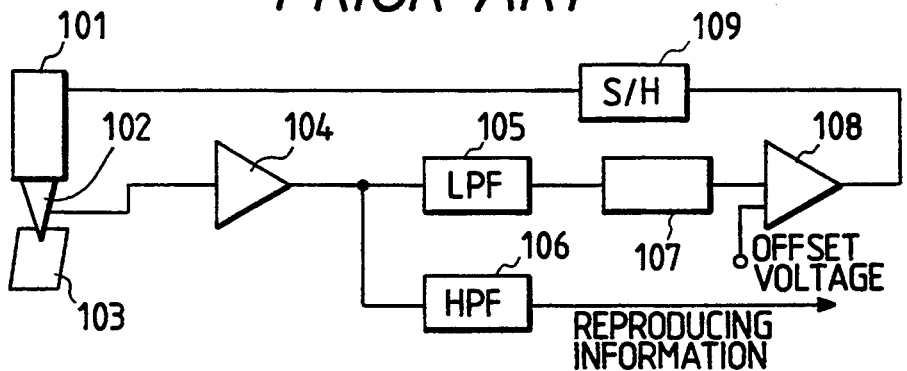
FIG. 1 is a block diagram showing the construction of a conventional information recording/reproducing apparatus.
Figure 2:
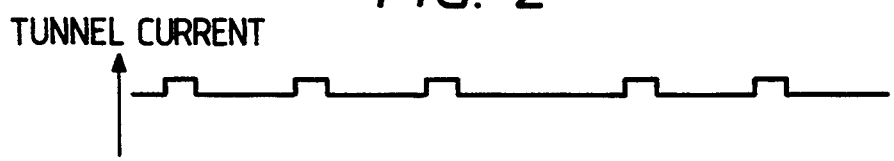
FIG. 2 is a timing chart showing the change in tunnel current when a smooth recording medium is scanned.
Figure 3:
FIG. 3 is a timing chart showing the change in high-frequency component of a tunnel current when a smooth recording medium is scanned.
Figure 4:
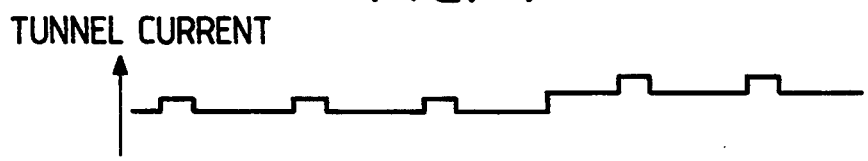
FIG. 4 is a timing chart showing the change in tunnel current when a recording medium having a step structure on its surface is scanned.
Figure 5:
FIG. 5 is a timing chart showing the change in high-frequency component of a tunnel current when a recording medium having a step structure on its surface is scanned.
Figure 8:
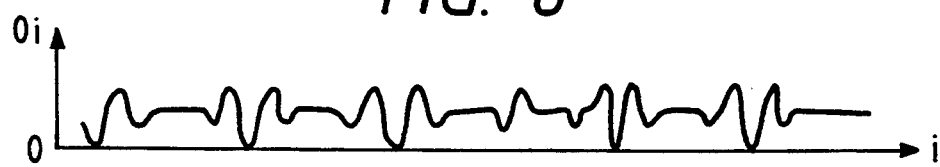
FIG. 8 is a timing chart showing the result of a sequential calculation of correlation values.

The digital signal processor 12 sequentially calculates this correlation value $O_i$ for each i and outputs the result. For example, when this sequential calculation is performed by using the data shown in FIG. 5 mentioned earlier, the result is as shown in FIG. 8, in which the correlation value $O_i$ is 0 exactly where recording bits are present and larger than 0 in other portions.

This calculation result is D/A-converted by the D/A converter 13 and supplied to the (−) input terminal of the comparator 14. In this case, if the variable power source 39 is set at a voltage slightly higher than 0 V, the output from the comparator 14 becomes "1" only at positions in which recording bits are present and "0" in other portions including a portion in which a step structure is present on the surface of the recording layer 3. As a result, the recording bits are correctly converted into a binary signal. This binary signal is supplied to the data modulation-demodulation part 52 of the CPU 21 and finally output to external equipment as reproducing information of this information recording/reproducing apparatus.

The first embodiment of the present invention has been described above. In the present invention, however, the function for obtaining the correlation between the detection signal and the signal pattern is not limited to the one represented by Equation (1). As an example, a function based on the square sum of the difference between the detection signal and the signal pattern can be effectively used.

The second embodiment of the present invention will be described below.

Figure 9:
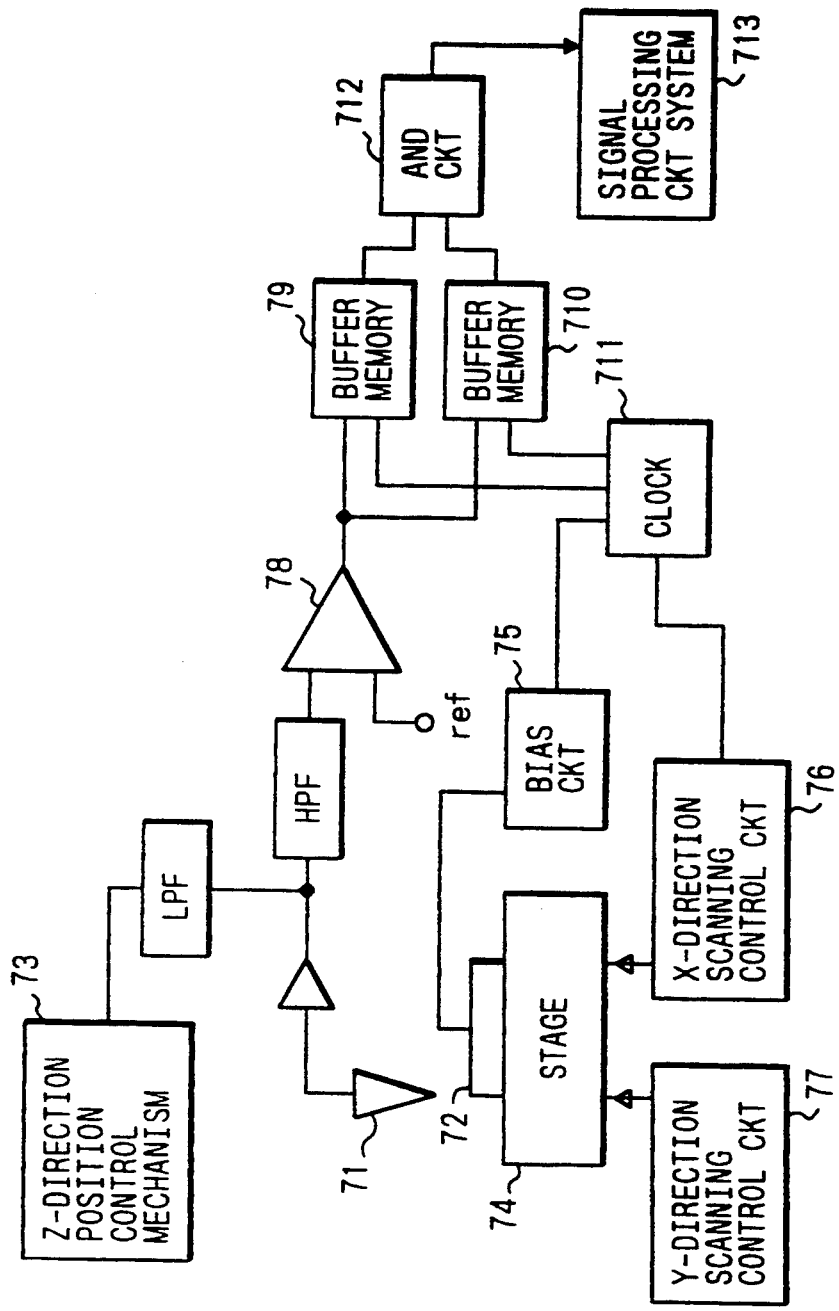
FIG. 9 is a block diagram showing the second embodiment of the information recording/reproducing apparatus according to the present invention.

FIG. 9 is a block diagram showing the construction of the second embodiment of the present invention.

In the second embodiment, reproduction of recorded information is performed by using a thin Au film epitaxially grown on a mica substrate, as an electrode substrate, and a very thin LB film, as a recording medium.

A recording medium 72 placed on a stage 74 is applied with a predetermined bias voltage from a bias circuit 75. A Z-direction position control mechanism 73 performs position control of a probe 71 in the Z direction (vertical direction of FIG. 9). The Z-direction position control mechanism 73 detects a tunnel current flowing between the probe 71 and the recording medium 72 upon application of the bias voltage and controls the distance between them in such a way which maintains the value of the tunnel current detected constant. A scanning mechanism for performing scan in a direction parallel to the surface of a sample 10 is constituted by an X-direction scanning control circuit 76 and a Y-direction scanning control circuit 77. Scan is performed by moving the stage 74 by using these circuits 76 and 77.

A tunnel current detected by the probe 71 is supplied to the Z-direction position control mechanism 73 and a comparator 78. The comparator 78, as comparing means, compares the supplied tunnel current value with a predetermined reference current value. If the tunnel current value is larger than the reference current value, the comparator 78 outputs level H as its output value; otherwise, the comparator 78 outputs level L. Buffer memories 79 and 710 receive and store the output levels from the comparator 78 in synchronism with a read clock signal generated by a clock circuit 711. An AND circuit 712 performs a logical product operation for a portion of the recording medium 72, which corresponds to the data received by the two buffer memories, after one forward-and-backward scan is completed, and supplies the result as reproduction data to a signal processing circuit system 713 provided after the AND circuit 712. The signal processing circuit system 713 is constructed to process, together with the AND circuit 712, the data as a digital signal, for example, level H as 1, and level L as 0.

The position control operation performed by the X-direction scanning control circuit 76 and Y-direction scanning control circuit 77 and the operation of receiving the output levels from the comparator 78 performed by the buffer memories 79 and 710 described above are controlled by a control unit (not shown).

In this embodiment, the above-mentioned control unit is arranged to store the output level from the comparator 78 in the buffer memory 79 in forward scan and in the buffer memory 710 in backward scan. In a practical situation, however, only a signal in forward scan need only be stored, and it is also possible to compare this forward-scan signal with a backward-scan signal in real time during backward scan. Therefore, the control unit may be arranged to perform control of this type.

An example of reproduction of information using the above information recording/reproducing apparatus will be described below.

Note that the recording medium used in the second embodiment is more specifically a recording medium disclosed in Japanese Laid-Open Patent Application Nos. 63-161552 and 63-161553, which is an SOAZ-LB film (two-layered film) stacked on an Au electrode, and a thin Au film epitaxially grown on mica is used as the electrode.

Electrical information writing is performed for the recording medium 72 by applying a voltage superposed with a continuous pulse wave with peak values of −6 V and +1.5 V, as a bias voltage, from the bias circuit 75 to between the sample and the probe in synchronism with a clock signal from the clock circuit 711. The dimensions of a write region are 1 μm wide in the X direction and 10 μm in the Y direction, the X-direction scanning frequency is 600 Hz, and the write clock frequency is 120 kHz. Note that the bit diameter is 5 nm and the bit pitch is 10 nm.

Figure 10:
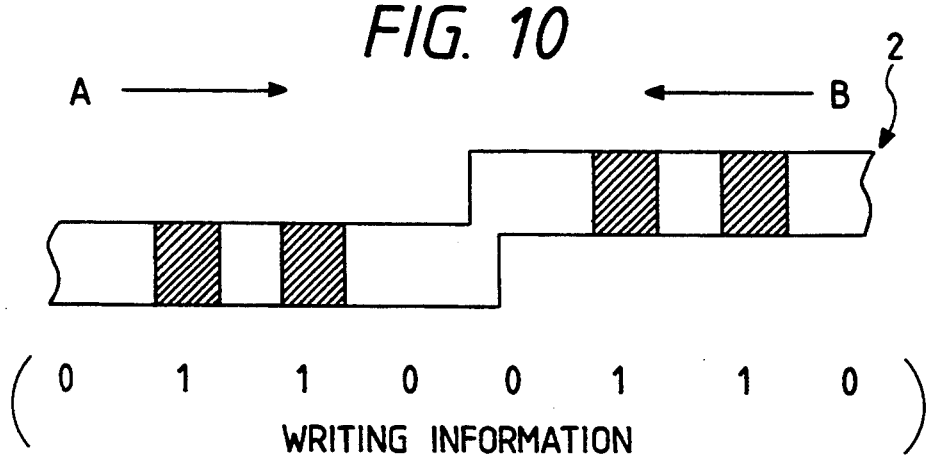
FIG. 10 is a schematic sectional view showing the condition of a recording medium 72, from which recorded information is reproduced, of the second embodiment shown in FIG. 9.

FIG. 10 is a schematic sectional view showing the condition of the recording medium 72 subjected to the writing operation of the above sort. FIGS. 11A and 11B are timing charts showing tunnel current signals when the scanning with the probe is performed in A and B directions, respectively, shown in FIG. 10.

Referring to FIG. 10, hatched portions indicate portions in which the conductivity is raised by recording. An atomic step with a height of 1 to 3 Å, that is produced upon epitaxial growth of Au, is present near the center of the recording medium 72 shown in FIG. 10. When a signal is reproduced in this condition, the probe 71 and the electrode constituting the recording medium 72 move closer together at the position of the atomic step, increasing a tunnel current. Therefore, when the scanning with the probe is performed in the A direction shown in FIG. 10, the tunnel current signal as shown in FIG. 11A is observed.

If this signal is directly binarized by a level a, as the reference current value of the comparator 78, and extracted as 0-1 data, the noise signal caused by the atomic step is also processed as data. That is, data that is originally (01100110) is determined as (01101110), resulting in mixing of an error bit. When, however, scan is performed in the B direction in FIG. 10 and then data is extracted, the tunnel current signal can be correctly recognized as a signal of (01100110) as shown in FIG. 11B. This is so because no noise is produced by the atomic step when the probe 71 and the electrode constituting the recording medium 2 physically move away from each other at the position of the atomic step, since the tunnel current value is binarized by comparison With the reference current value (level a) by the comparator 78.

In this embodiment, the data of forward scan, in which scan is performed in the A direction, is stored in the buffer memory 79, and the data of backward scan, in which scan is performed in the B direction, is stored in the buffer memory 710. The AND circuit 712 produces the logical product of these stored data and outputs it as reproduction data. This makes it possible to prevent an error caused by a noise component produced by the atomic step from occurring in a reproduction signal.

Note that FIG. 10 illustrates an example in which the atomic step is present in a direction from left to right in FIG. 10, and a noise component due to the atomic step is produced when scan is performed in the A direction. If, however, the atomic step is present in a direction from right to left in FIG. 10, a noise component is naturally produced when scan is performed in the B direction. In this embodiment, since the logical product of the data of forward scan and backward scan is used as reproduction data, correct reproduction data can be obtained regardless of the scanning direction.

When write signals and reproduction signals were actually compared with each other by using the above construction, it was possible to suppress the error ratio (a ratio at which 0 is recognized as 1) resulting from the atomic step to 0.01% or less.

Note that the present invention is directed to removal of an error caused by a step structure on the surface of a crystal. In the above embodiment, the changes in conductivity of the LB film are used as recording bits, and so no description has been made for a step formed on the surface of a recording medium. However, the present invention can be similarly applied to a system in which a crystal surface is used as the surface of a recording medium and physical projections and recesses are formed as recording bits.

In addition, only reproduction of recorded information has been described in the above embodiment. The present invention, however, is naturally applicable to a recording/reproducing apparatus having a function of writing information in a recording medium, such as those disclosed in Japanese Laid-Open Patent Application Nos. 63-161552 and 63-161553.

What is claimed is:

1. An apparatus for reproducing information bit recorded on a recording medium using a probe disposed to face the recording medium, comprising:
   detecting means for detecting the information bit recorded on the recording medium using said probe, said detecting means having an output signal including a high frequency component; and
   reproduction signal generating means for generating a reproduction signal by removing a noise component due to an influence of an atomic step present on a surface of said recording medium from said output signal of said detecting means, said noise component being included in said high frequency component,
   wherein reproduction of information from said recording medium is performed on the basis of the reproduction signal.

2. An apparatus according to claim 1, further comprising memory means for storing an ideal output signal pattern of said detecting means, obtained when reproducing a unit information bit, wherein said reproduction signal generating means calculates a correlation between the output signal of said detecting means and the output signal pattern stored in said memory means and generates the reproduction signal on the basis of the calculation result.

3. An apparatus according to claim 1, wherein said detecting means includes means for applying a voltage between the recording medium and said probe, and means for detecting a tunnel current flowing between said probe and the recording medium upon application of the voltage, wherein the information bit is detected by variation of said tunnel current.

4. An apparatus according to claim 1, further comprising scanning means for effecting reciprocal scanning between said probe and the recording medium, wherein said reproduction signal generating means includes memory means for storing a signal which is detected upon forward scanning by said scanning means and which corresponds to the output signal of said detecting means, and means for generating a logical product of the output signal stored in said memory means and a signal which is detected upon backward scanning by said scanning means and which corresponds to the output signal of said detecting means, wherein an output signal of said logical product generating means is said reproduction signal.

5. An apparatus according to claim 4, wherein said detecting means includes means for applying a voltage between said probe and the recording medium and means for detecting a tunnel current flowing between said probe and the recording medium upon application of the voltage, wherein the information bit is detected by variation of said tunneling current.

* * * * *